United States Patent
Ghasripoor et al.

(10) Patent No.: US 9,970,281 B2
(45) Date of Patent: May 15, 2018

(54) SYSTEM AND METHOD FOR OFFSHORE (TOPSIDE OR SUBSEA) AND ONSHORE WATER REINJECTION FOR SECONDARY RECOVERY

(71) Applicant: Energy Recovery, Inc., San Leandro, CA (US)

(72) Inventors: Farshad Ghasripoor, Berkeley, CA (US); Jeremy Grant Martin, Oakland, CA (US); David Deloyd Anderson, Castro Valley, CA (US); Joel Gay, San Ramon, CA (US)

(73) Assignee: ENERGY RECOVERY, INC., San Leandro, CA (US)

( * ) Notice: Subject to any disclaimer, the term of this patent is extended or adjusted under 35 U.S.C. 154(b) by 88 days.

(21) Appl. No.: 15/075,554

(22) Filed: Mar. 21, 2016

(65) Prior Publication Data
US 2016/0281487 A1    Sep. 29, 2016

Related U.S. Application Data

(60) Provisional application No. 62/136,842, filed on Mar. 23, 2015.

(51) Int. Cl.
| E21B 43/16 | (2006.01) |
| E21B 43/20 | (2006.01) |
| E21B 43/36 | (2006.01) |
| E21B 43/40 | (2006.01) |
| F04F 13/00 | (2009.01) |

(52) U.S. Cl.
CPC .............. *E21B 43/40* (2013.01); *E21B 43/16* (2013.01); *E21B 43/20* (2013.01); *E21B 43/36* (2013.01); *F04F 13/00* (2013.01)

(58) Field of Classification Search
CPC .......... E21B 43/01; E21B 43/12; E21B 43/16; E21B 43/20; E21B 43/34; E21B 43/36; E21B 43/40; C02F 1/40; B01D 17/02
See application file for complete search history.

(56) References Cited

U.S. PATENT DOCUMENTS

| 3,780,808 A | 12/1973 | Christopher et al. |
| 7,871,522 B2 * | 1/2011 | Stover .................. B01D 61/022 |
| | | 210/195.2 |
| 2012/0067825 A1 * | 3/2012 | Pique ....................... E21F 3/00 |
| | | 210/723 |
| 2013/0280038 A1 * | 10/2013 | Martin ................... F03B 13/00 |
| | | 415/110 |

FOREIGN PATENT DOCUMENTS

| KR | 101453497 B1 * | 11/2014 |
| WO | 2014/018585 A1 | 1/2014 |

OTHER PUBLICATIONS

PCT International Search Report & Written Opinion; Application No. PCT/US2016/023635; dated Jul. 14, 2016; 12 pages.

* cited by examiner

*Primary Examiner* — Matthew R Buck
(74) *Attorney, Agent, or Firm* — Fletcher Yoder, P.C.

(57) ABSTRACT

A system includes a fluid injection system. The fluid injection system includes a rotary isobaric pressure exchanger (IPX) configured to receive a first fluid, to receive a second fluid extracted from a source well, to utilize the second fluid to pressurize the first fluid for injection into an injection well, and to inject the pressurized first fluid into the injection well.

20 Claims, 10 Drawing Sheets

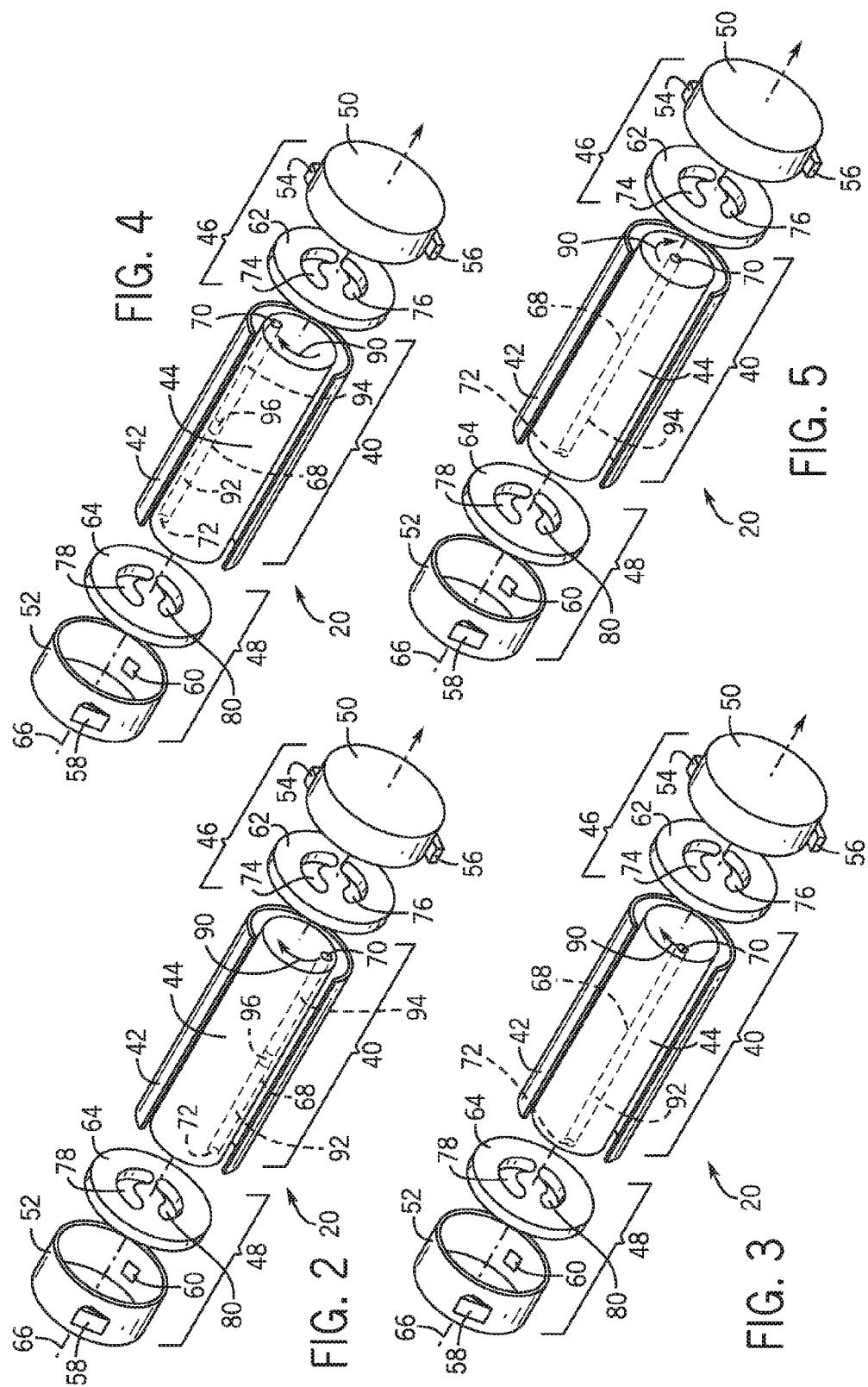

SYSTEM AND METHOD FOR OFFSHORE (TOPSIDE OR SUBSEA) AND ONSHORE WATER REINJECTION FOR SECONDARY RECOVERY

CROSS-REFERENCE TO RELATED APPLICATIONS

This application is a non-provisional of U.S. Provisional Patent Application No. 62/136,842, entitled "SYSTEM AND METHOD FOR OFFSHORE (TOPSIDE OR SUBSEA) AND ONSHORE WATER REINJECTION FOR SECONDARY RECOVERY", filed Mar. 23, 2015, which is herein incorporated by reference in its entirety.

BACKGROUND

This section is intended to introduce the reader to various aspects of art that may be related to various aspects of the present invention, which are described and/or claimed below. This discussion is believed to be helpful in providing the reader with background information to facilitate a better understanding of the various aspects of the present invention. Accordingly, it should be understood that these statements are to be read in this light, and not as admissions of prior art.

The subject matter disclosed herein relates to fluid handling, and, more particularly, to systems and methods for utilizing an isobaric pressure exchanger (IPX) in pressurizing water for injection in secondary recovery of hydrocarbons from reservoirs or for waste water disposal.

A variety of fluids may be used in the production or recovery of hydrocarbons (e.g., oil and gas) from the earth. For example, during oil and gas production, produced water (i.e., water separated from a fluid including hydrocarbons) may be utilized in water injection to maintain pressure in a well or raise pressure in wells that do not produce hydrocarbons under natural pressure. Typically, heavy water injection pumps and associated power generation equipment are utilized to inject the water (e.g., produced water) at a high pressure and a high flow rate into an injection well (e.g., enhanced recovery well, disposal well, etc.). Similar equipment and methods may also be used for waste water disposal. This equipment has a large footprint and requires significant power. On off-shore oil platforms, space, weight capacity, and power resources are limited. In addition, water injection pumps are unreliable, costly, and difficult to service due to their size and complexities.

BRIEF DESCRIPTION OF THE DRAWINGS

Various features, aspects, and advantages of the present invention will become better understood when the following detailed description is read with reference to the accompanying figures in which like characters represent like parts throughout the figures, wherein:

FIG. 2 is an exploded perspective view of an embodiment of a rotary IPX in a first operating position;

FIG. 3 is an exploded perspective view of an embodiment of a rotary IPX in a second operating position;

FIG. 4 is an exploded perspective view of an embodiment of a rotary IPX in a third operating position;

FIG. 5 is an exploded perspective view of an embodiment of a rotary IPX in a fourth operating position;

DETAILED DESCRIPTION OF SPECIFIC EMBODIMENTS

Figure 1:
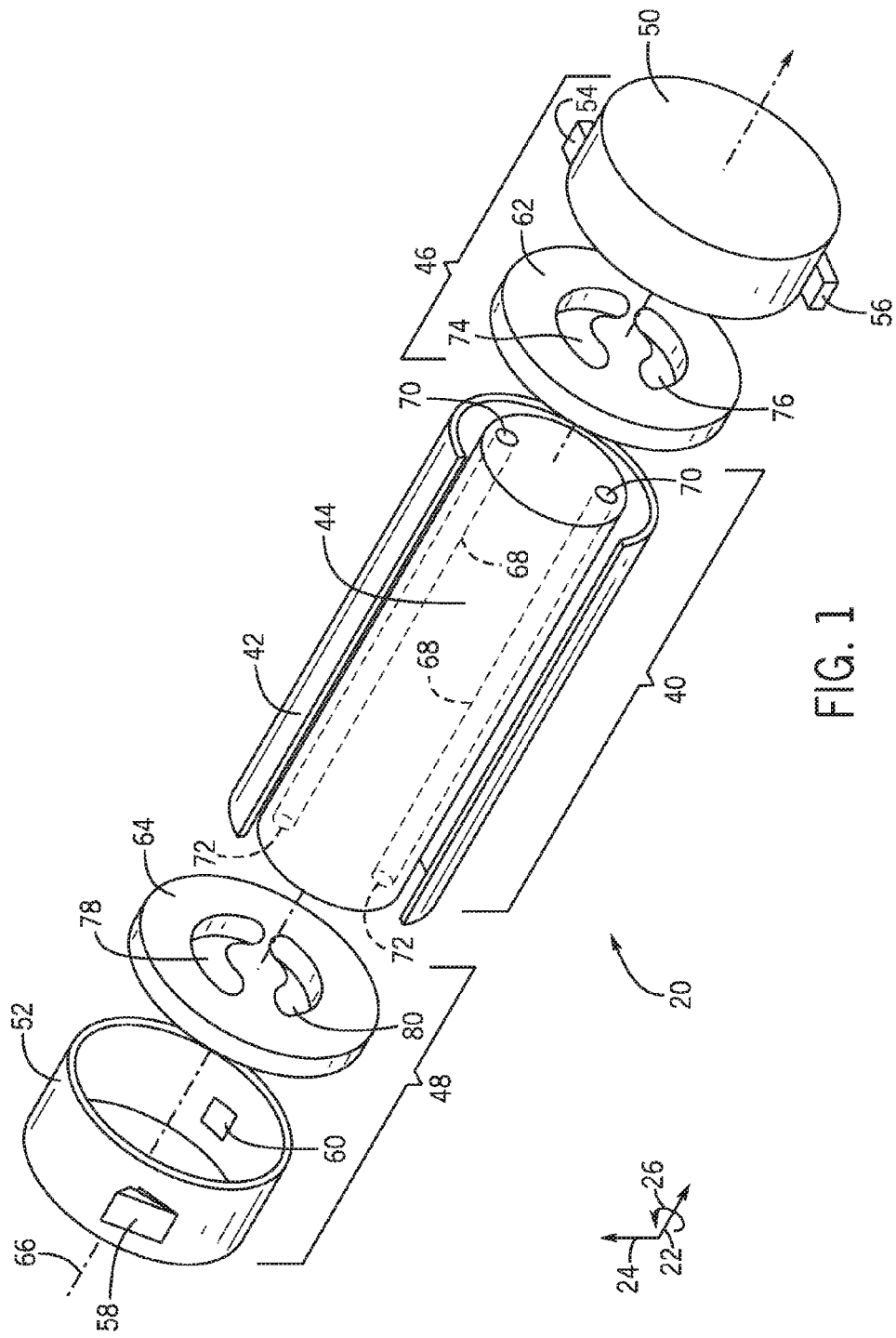
FIG. 1 is an exploded perspective view of an embodiment of a rotary isobaric pressure exchanger (IPX)

One or more specific embodiments of the present invention will be described below. These described embodiments are only exemplary of the present invention. Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

As discussed in detail below, a fluid injection system (e.g. water injection system) includes a hydraulic energy transfer system that transfers work and/or pressure between first and second fluids. In some embodiments, the hydraulic energy transfer system may be a rotating isobaric pressure exchanger (IPX) that transfers pressure between a high pressure first fluid (e.g., high pressure multi-phase fluid containing hydrocarbon fluid such as oil or gas flowing from a producing well) and a low pressure second fluid (e.g., single phase fluid such as produced water separated from hydrocarbons, treated water, sea water, etc.). Pressurizing the produced water for injection or reinjection into a low pressure well (e.g., with a low recovery factor) enables stimulation of the well to increase the recovery factor. The equipment associated with the fluid injection system including the IPX may also be utilized with disposal wells onshore and offshore. The equipment associated with the fluid injection system including the IPX may be utilized in offshore or onshore hydrocarbon production operations. In offshore hydrocarbon production operations, some or all of the fluid injection system equipment including the IPX may be disposed topside (i.e., on the platform) and/or under water (i.e., subsea). The utilization of the IPX in the fluid injection system eliminates or reduces the need for high pressure, high flow rate pumps. In addition, the utilization of the IPX eliminates or reduces the need for power (e.g., electricity) utilized to run the pumps. The IPX would require little or no electrical power. Further, the utilization of the IPX reduces the footprint of the pump and associated power generation equipment, especially on offshore platforms when the pump and/or other components of the fluid injection system are moved under water (e.g., on the seafloor). Yet further, the utilization of the IPX may eliminate or reduce the need for a valve system (e.g., choke valve system) to reduce the pressure of hydrocarbons (e.g., oil or gas) flowing from a producing well. Even further, the replacement of the water injection pump with the IPX may increase recovery rates from wells. Still further, the utilization of the IPX is a simple solution. The IPX is compact, easy to maintain, and can easily be deployed with redundancy.

The IPX may include one or more chambers (e.g., 1 to 100) to facilitate pressure transfer and equalization of pressures between volumes of first and second fluids. In some embodiments, the pressures of the volumes of first and second fluids may not completely equalize. Thus, in certain embodiments, the IPX may operate isobarically, or the IPX may operate substantially isobarically (e.g., wherein the pressures equalize within approximately +/−1, 2, 3, 4, 5, 6, 7, 8, 9, or 10 percent of each other). In certain embodiments, a first pressure of a first fluid (e.g., fluid including water and high pressure hydrocarbons such as oil or gas extracted from a producing well) may be greater than a second pressure of a second fluid (e.g., produced water separated from hydrocarbons, treated water, sea water, etc.). For example, the first pressure may be between approximately 5,000 kPa to 25,000 kPa, 20,000 kPa to 50,000 kPa, 40,000 kPa to 75,000 kPa, 75,000 kPa to 100,000 kPa or greater than the second pressure. Thus, the IPX may be used to transfer pressure from a first fluid (e.g., fluid including water and high pressure hydrocarbons such as oil or gas extracted from a producing well) at a higher pressure to a second fluid (e.g., produced water separated from hydrocarbons, treated water, sea water, etc.) at a lower pressure.

FIG. 1 is an exploded view of an embodiment of a rotary IPX 20 that may be utilized in a fluid injection system, as described in detail below. As used herein, the isobaric pressure exchanger (IPX) may be generally defined as a device that transfers fluid pressure between a high-pressure inlet stream and a low-pressure inlet stream at efficiencies in excess of approximately 50%, 60%, 70%, or 80% without utilizing centrifugal technology. In this context, high pressure refers to pressures greater than the low pressure. The low-pressure inlet stream of the IPX may be pressurized and exit the IPX at high pressure (e.g., at a pressure greater than that of the low-pressure inlet stream), and the high-pressure inlet stream may be depressurized and exit the IPX at low pressure (e.g., at a pressure less than that of the high-pressure inlet stream). Additionally, the IPX may operate with the high-pressure fluid directly applying a force to pressurize the low-pressure fluid, with or without a fluid separator between the fluids. Examples of fluid separators that may be used with the IPX include, but are not limited to, pistons, bladders, diaphragms and the like. In certain embodiments, isobaric pressure exchangers may be rotary devices. Rotary isobaric pressure exchangers (IPXs) 20, such as those manufactured by Energy Recovery, Inc. of San Leandro, Calif., may not have any separate valves, since the effective valving action is accomplished internal to the device via the relative motion of a rotor with respect to end covers, as described in detail below with respect to FIGS. 1-5. Rotary IPXs may be designed to operate with internal pistons to isolate fluids and transfer pressure with little mixing of the inlet fluid streams. Reciprocating IPXs may include a piston moving back and forth in a cylinder for transferring pressure between the fluid streams. Any IPX or plurality of IPXs may be used in the disclosed embodiments, such as, but not limited to, rotary IPXs, reciprocating IPXs, or any combination thereof. While the discussion with respect to certain embodiments for measuring the speed of the rotor may refer to rotary IPXs, it is understood that any IPX or plurality of IPXs may be substituted for the rotary IPX in any of the disclosed embodiments.

In the illustrated embodiment of FIG. 1, the rotary IPX 20 may include a generally cylindrical body portion 40 that includes a housing 42 and a rotor 44. The rotary IPX 20 may also include two end structures 46 and 48 that include manifolds 50 and 52, respectively. Manifold 50 includes inlet and outlet ports 54 and 56 and manifold 52 includes inlet and outlet ports 60 and 58. For example, inlet port 54 may receive a high-pressure first fluid and the outlet port 56 may be used to route a low-pressure first fluid away from the IPX 20. Similarly, inlet port 60 may receive a low-pressure second fluid and the outlet port 58 may be used to route a high-pressure second fluid away from the IPX 20. The end structures 46 and 48 include generally flat end plates 62 and 64, respectively, disposed within the manifolds 50 and 52, respectively, and adapted for liquid sealing contact with the rotor 44. The rotor 44 may be cylindrical and disposed in the housing 42, and is arranged for rotation about a longitudinal axis 66 of the rotor 44. The rotor 44 may have a plurality of channels 68 extending substantially longitudinally through the rotor 44 with openings 70 and 72 at each end arranged symmetrically about the longitudinal axis 66. The openings 70 and 72 of the rotor 44 are arranged for hydraulic communication with the end plates 62 and 64, and inlet and outlet apertures 74 and 76, and 78 and 80, in such a manner that during rotation they alternately hydraulically expose liquid at high pressure and liquid at low pressure to the respective manifolds 50 and 52. The inlet and outlet ports 54, 56, 58, and 60, of the manifolds 50 and 52 form at least one pair of ports for high-pressure liquid in one end element 46 or 48, and at least one pair of ports for low-pressure liquid in the opposite end element, 48 or 46. The end plates 62 and 64, and inlet and outlet apertures 74 and 76, and 78 and 80 are designed with perpendicular flow cross sections in the form of arcs or segments of a circle.

With respect to the IPX 20, the plant operator has control over the extent of mixing between the first and second fluids, which may be used to improve the operability of the fluid handling system. For example, varying the proportions of the first and second fluids entering the IPX 20 allows the plant operator to control the amount of fluid mixing within the fluid handling system. Three characteristics of the IPX 20 that affect mixing are: the aspect ratio of the rotor channels 68, the short duration of exposure between the first and second fluids, and the creation of a liquid barrier (e.g., an interface) between the first and second fluids within the rotor channels 68. First, the rotor channels 68 are generally long and narrow, which stabilizes the flow within the IPX 20. In addition, the first and second fluids may move through the channels 68 in a plug flow regime with very little axial mixing. Second, in certain embodiments, at a rotor speed of approximately 1200 RPM, the time of contact between the first and second fluids may be less than approximately 0.15 seconds, 0.10 seconds, or 0.05 seconds, which again limits mixing of the streams 18 and 30. Third, a small portion of the rotor channel 68 is used for the exchange of pressure between the first and second fluids. Therefore, a volume of fluid remains in the channel 68 as a barrier between the first and second fluids. All these mechanisms may limit mixing within the IPX 20.

In addition, because the IPX 20 is configured to be exposed to the first and second fluids, certain components of the IPX 20 may be made from materials compatible with the components of the first and second fluids. In addition, certain components of the IPX 20 may be configured to be physically compatible with other components of the fluid handling system. For example, the ports 54, 56, 58, and 60 may comprise flanged connectors to be compatible with other flanged connectors present in the piping of the fluid handling system. In other embodiments, the ports 54, 56, 58, and 60 may comprise threaded or other types of connectors.

FIGS. 2-5 are exploded views of an embodiment of the rotary IPX 20 illustrating the sequence of positions of a single channel 68 in the rotor 44 as the channel 68 rotates through a complete cycle, and are useful to an understanding of the rotary IPX 20. It is noted that FIGS. 2-5 are simplifications of the rotary IPX 20 showing one channel 68 and the channel 68 is shown as having a circular cross-sectional shape. In other embodiments, the rotary IPX 20 may include a plurality of channels 68 (e.g., 2 to 100) with different cross-sectional shapes. Thus, FIGS. 2-5 are simplifications for purposes of illustration, and other embodiments of the rotary IPX 20 may have configurations different from that shown in FIGS. 2-5. As described in detail below, the rotary IPX 20 facilitates a hydraulic exchange of pressure between two liquids by putting them in momentary contact within a rotating chamber. In certain embodiments, this exchange happens at a high speed that results in very high efficiency with very little mixing of the liquids.

In FIG. 2, the channel opening 70 is in hydraulic communication with aperture 76 in endplate 62 and therefore with the manifold 50 at a first rotational position of the rotor 44 and opposite channel opening 72 is in hydraulic communication with the aperture 80 in endplate 64, and thus, in hydraulic communication with manifold 52. As discussed below, the rotor 44 rotates in the clockwise direction indicated by arrow 90. As shown in FIG. 2, low-pressure second fluid 92 passes through end plate 64 and enters the channel 68, where it pushes first fluid 94 out of the channel 68 and through end plate 62, thus exiting the rotary IPX 20. The first and second fluids 92 and 94 contact one another at an interface 96 where minimal mixing of the liquids occurs because of the short duration of contact. The interface 96 is a direct contact interface because the second fluid 92 directly contacts the first fluid 94.

In FIG. 3, the channel 68 has rotated clockwise through an arc of approximately 90 degrees, and outlet 72 is now blocked off between apertures 78 and 80 of end plate 64, and outlet 70 of the channel 68 is located between the apertures 74 and 76 of end plate 62 and, thus, blocked off from hydraulic communication with the manifold 50 of end structure 46. Thus, the low-pressure second fluid 92 is contained within the channel 68.

In FIG. 4, the channel 68 has rotated through approximately 180 degrees of arc from the position shown in FIG. 2. Opening 72 is in hydraulic communication with aperture 78 in end plate 64 and in hydraulic communication with manifold 52, and the opening 70 of the channel 68 is in hydraulic communication with aperture 74 of end plate 62 and with manifold 50 of end structure 46. The liquid in channel 68, which was at the pressure of manifold 52 of end structure 48, transfers this pressure to end structure 46 through outlet 70 and aperture 74, and comes to the pressure of manifold 50 of end structure 46. Thus, high-pressure first fluid 94 pressurizes and displaces the second fluid 92.

In FIG. 5, the channel 68 has rotated through approximately 270 degrees of arc from the position shown in FIG. 2, and the openings 70 and 72 of channel 68 are between apertures 74 and 76 of end plate 62, and between apertures 78 and 80 of end plate 64. Thus, the high-pressure first fluid 94 is contained within the channel 68. When the channel 68 rotates through approximately 360 degrees of arc from the position shown in FIG. 3, the second fluid 92 displaces the first fluid 94, restarting the cycle.

Figure 6:
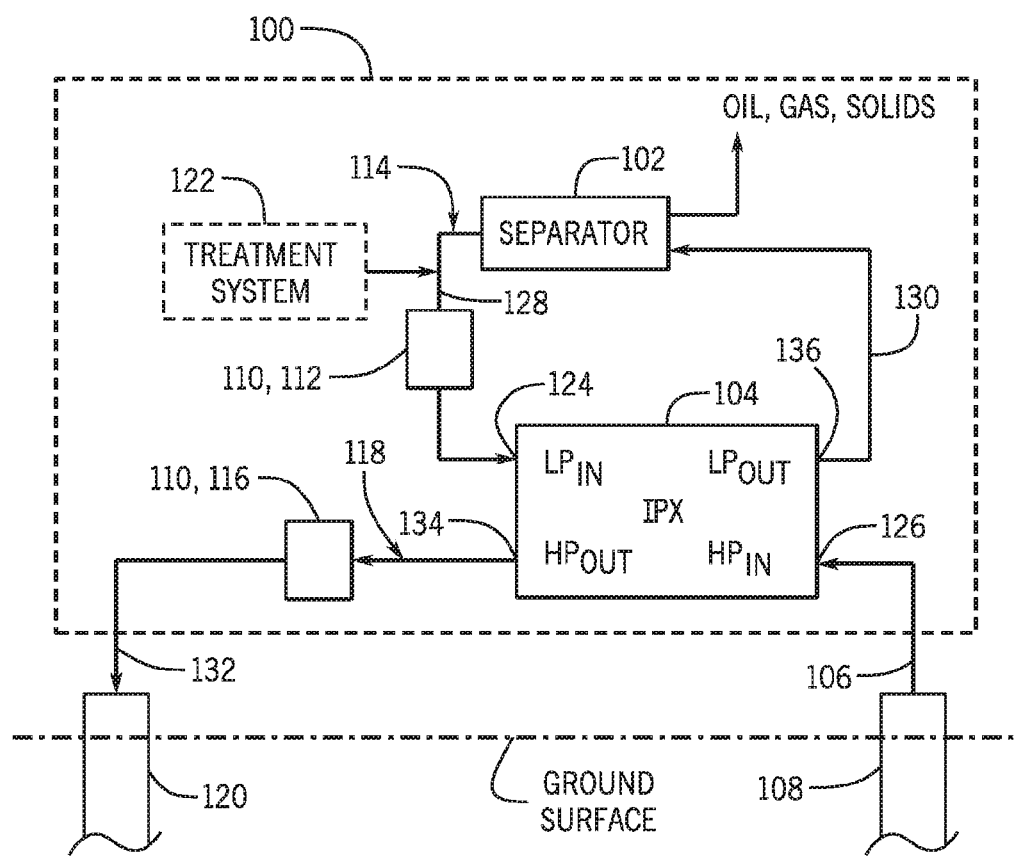
FIG. 6 is a schematic diagram of an embodiment of a fluid injection system (e.g., with a separator) having a rotary IPX.

FIG. 6 is a schematic diagram of an embodiment of a fluid injection system 100 (e.g., with a separator 102) having a rotary IPX 104. As noted above, the fluid injection system 100 may be utilized in offshore or onshore hydrocarbon production operations. In offshore hydrocarbon production operations, some or all of the fluid injection system equipment including the IPX 104 may be disposed topside (i.e., on the platform) and/or under water (i.e., subsea). In other words all of the fluid injection system equipment may be located topside, all of the fluid injection system equipment may be located under water, or some of the fluid injection system equipment may be located topside and the rest of the equipment located under water. The fluid injection system 100 includes the IPX 104 as described above. The fluid injection system 100 also includes a separator 102 (e.g., pressure vessel) to separate various components (e.g., oil, gas, solids such rocks or other sediment, produced water, or other components) from the fluid 106 (e.g., high pressure fluid) extracted from a source well 108 (e.g., producing well). The fluid injection system 100 further includes one or more flow control devices 110 (e.g., pumps, valves, eductors, etc.) to control the flow of fluids within the fluid injection system 100. For example, as depicted in FIG. 6, a flow control device 112 is disposed along a fluid flow path 114 (e.g., low pressure produced water flow path) between the separator 102 and the IPX 104. Also, a flow control device 116 is disposed along a fluid flow path 118 (high pressure produced water flow path) between the IPX 104 and an injection well 120 (e.g., enhanced recovery well, disposal well, etc.). In certain embodiments, the fluid injection system 100 includes a treatment system 122 to treat the produced water (e.g., low pressure produced water along the fluid flow path 114. For example, the treatment system 122 may provide or inject one or more chemicals with low surface tension into the low pressure produced water upstream of a low pressure inlet 124 of the IPX 104 to lower the surface tension of the low pressure produced water.

The fluid injection system 100 functions by receiving a high pressure fluid 106 (e.g., including hydrocarbons such as oil and/or gas) extracted from the source well 108. The high pressure fluid 106 flows into a high pressure inlet 126 of the IPX 104. Low pressure produced water or treated produced water 128 flows from the separator 102 (or a tank that stores the generated produced water) to the low pressure inlet 124 of the IPX 104. The flow control device 112 may regulate the flow of the low pressure produced water or treated produced water 128 to the IPX 104. In the IPX 104, pressure is transferred from the high pressure fluid 106 to the low pressure produced water 128 resulting in a low pressure fluid 130 for the fluid 106 extracted from the source well 108 and a high pressure produced water 132. The high pressure produced water 132, after exiting a high pressure outlet 134 of the IPX 104, is utilized by the fluid injection system 100 for injection or reinjection into the injection well 120, e.g., in recovery wells, to enhance recovery of hydrocarbons from a hydrocarbon reservoir. The flow control device 116 may regulate the flow of the high pressure produced water 132 for injection into the injection wall 120. The low pressure fluid 130 (e.g., including hydrocarbons), after exiting a low pressure outlet 136 of the IPX 104, is provided to the separator 102 for separation into various components (e.g., oil, gas, produced water, etc.). The produced water 128 generated by the separator 102 may be stored in a tank or utilized immediately in injection operations.

Figure 7:
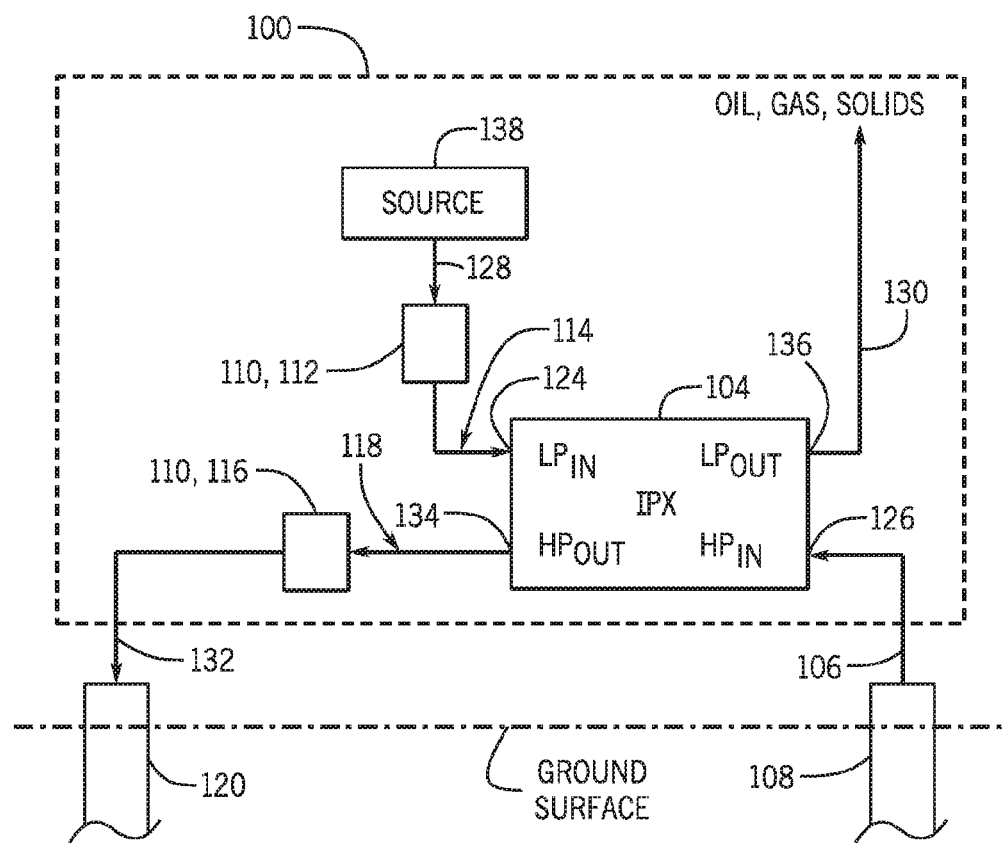
FIG. 7 is a schematic diagram of an embodiment of a fluid injection system (e.g., without a separator) having a rotary IPX.

FIG. 7 is a schematic diagram of an embodiment of fluid injection system 100 (e.g., without a separator 102) having the rotary IPX 104. As noted above, the fluid injection system 100 may be utilized in offshore or onshore hydrocarbon production operations. In offshore hydrocarbon production operations, some or all of the fluid injection system equipment including the IPX 104 may be disposed topside (i.e., on the platform) and/or under water (i.e., subsea). In other words all of the fluid injection system equipment may be located topside, all of the fluid injection system equipment may be located under water, or some of the fluid injection system equipment may be located topside and the rest of the equipment located under water. The fluid injection system 100 includes the IPX 104 as described above. The fluid injection system 100 further includes one or more flow control devices 110 (e.g., pumps, valves, eductors, etc.) to control the flow of fluids within the fluid injection system 100. For example, as depicted in FIG. 7, a flow control device 112 is disposed along the fluid flow path 114 (e.g., low pressure fluid flow path) between a source 138 (e.g., tank) of low pressure fluid 128 such as treated water (e.g., produced water or water source treated as described above in FIG. 6) or seawater and the IPX 104. Also, a flow control device 116 is disposed along the fluid flow path 118 (high pressure produced water flow path) between the IPX 104 and an injection well 120 (e.g., enhanced recovery well, disposal well, etc.). In certain embodiments, the fluid injection system 100 includes a treatment system (e.g., disposed along path 114 upstream or downstream of the source 138) to treat the low pressure water 128 as described above.

The fluid injection system 100 functions by receiving a high pressure fluid 106 (e.g., including hydrocarbons such as oil and/or gas) extracted from the source well 108. The high pressure fluid 106 flows into the high pressure inlet 126 of the IPX 104. Low pressure treated water or seawater 128 flows from the source 138 (e.g., tank) to the low pressure inlet 124 of the IPX 104. The flow control device 112 may regulate the flow of the low pressure treated water or seawater 128 to the IPX 104. In the IPX 104, pressure is transferred from the high pressure fluid 106 to the low pressure treated water or seawater 128 resulting in a low pressure fluid 130 for the fluid extracted from the source well 108 and a high pressure treated water or seawater 132. The high pressure treated water or seawater 132, after exiting the high pressure outlet 134 of the IPX 104, is utilized by the fluid injection system 100 for injection or reinjection into the injection well 120, e.g., in recovery wells, to enhance recovery of hydrocarbons from a hydrocarbon reservoir. The flow control device 116 may regulate the flow of the high pressure treated water or seawater 132 for injection into the injection wall 120. The low pressure fluid 130 (e.g., including hydrocarbons), after exiting the low pressure outlet 136 of the IPX 104, is provided to further production equipment (e.g., a separator for separation into various components (e.g., oil, gas, solids, produced water, etc.)).

Figure 8:
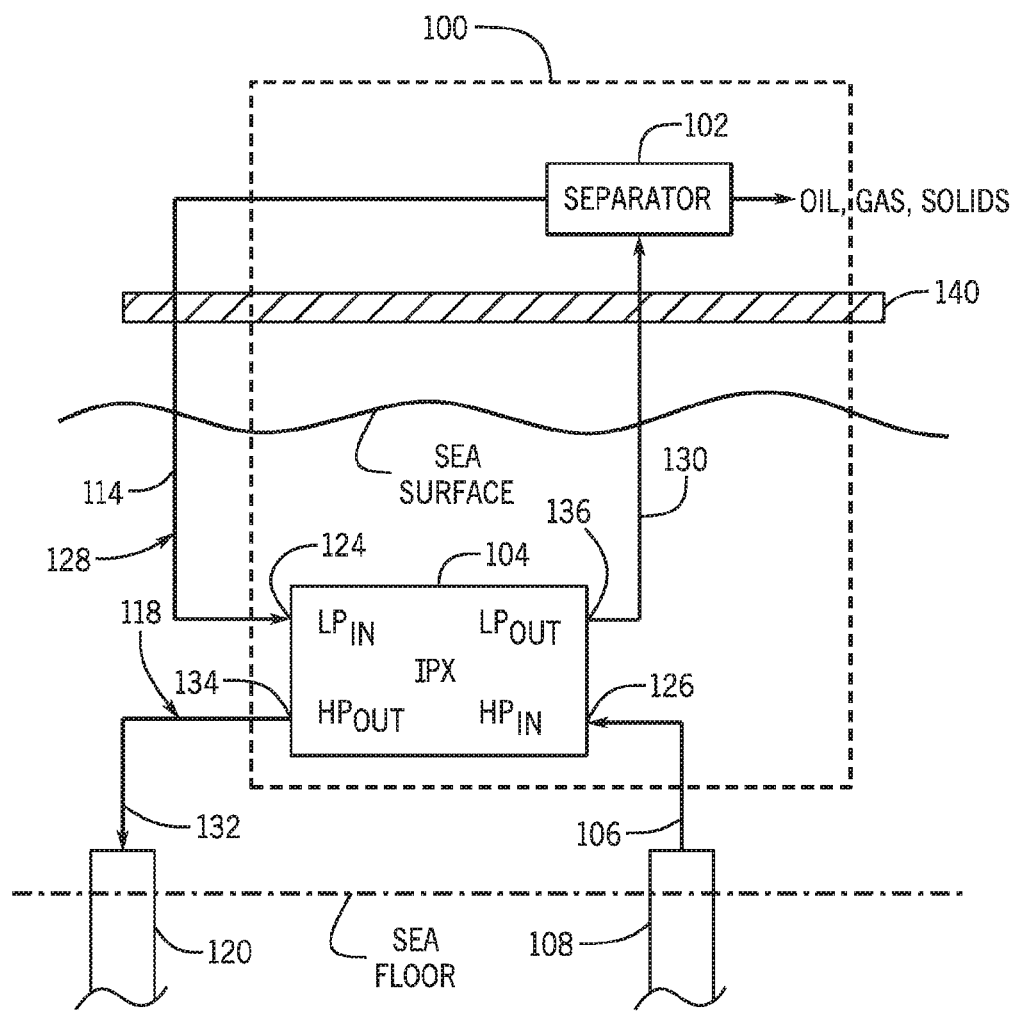
FIG. 8 is a schematic diagram of an embodiment of a fluid injection system having a rotary IPX utilized offshore and located subsea.

FIG. 8 is a schematic diagram of an embodiment of a fluid injection system 100 having a rotary IPX 104 utilized offshore (e.g., on an oil platform 140). In general, the fluid injection system 100 in FIG. 8 operates as described in FIG. 6. As depicted in FIG. 8, the separator 102 is located topside on the oil platform, while the IPX 104 is located under water (e.g., on the sea floor). In certain embodiments of the fluid injection system 100, the separator 102 may be located under water also. In other embodiments, the IPX 104 may be located topside on the oil platform 140. The location of the components of the fluid injection system 100 (in particular, the IPX 104) depends on the conditions of the reservoir and other factors.

Figure 9:
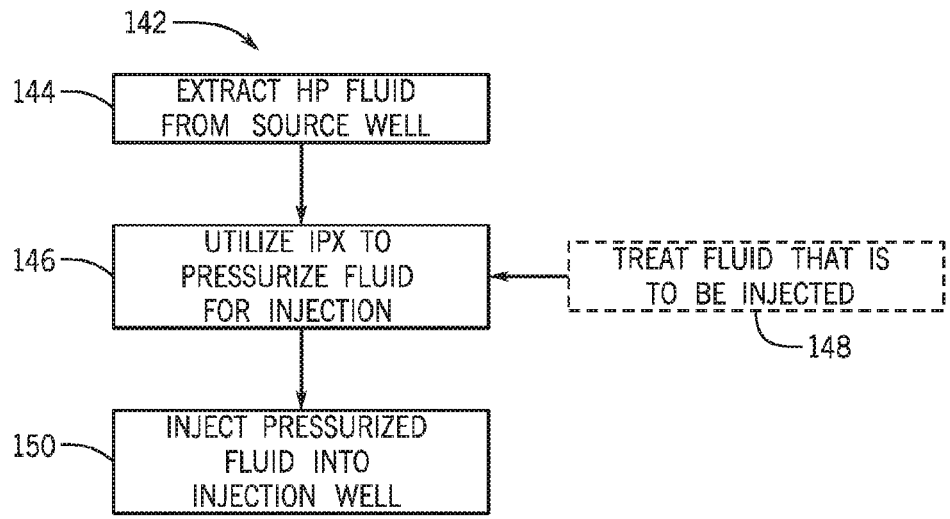
FIG. 9 is a flowchart of an embodiment of a method for pressurizing a fluid for injection or reinjection into a well.

FIG. 9 is a flowchart of an embodiment of a method 142 for pressurizing a fluid for injection or reinjection into a well 120 (e.g., injection well). The method 142 includes extracting a high pressure fluid (e.g., including hydrocarbons such as oil and/or gas) from a source well 108 (e.g., producing well) (block 144). The method 142 also includes utilizing the IPX 104 to transfer pressure from the high pressure fluid to a low pressure fluid (e.g., sea water, treated water, produced water, treated produced water, etc.) for use in injection (or reinjection) (block 146). The low pressure fluid enters the IPX 104 via a low pressure inlet 124. In certain embodiments, the method 142 includes treating the low pressure fluid as described above upstream of the low pressure inlet 124 of the IPX 104 (block 148). The method 142 includes injecting (or reinjecting) the pressurized fluid (e.g., sea water, treated water, produced water, treated produced water, etc.), after it exits the IPX 104 via a high pressure outlet 134, into an injection well 120 (e.g., enhanced recovery well, disposal well, etc.) (block 150). The fluid (e.g., including hydrocarbons) utilized to pressurize the low pressure fluid (e.g., sea water, treated water, produced water, treated produced water, etc.) exits the IPX 104 at a lower pressure via a low pressure outlet 136.

Figure 10:
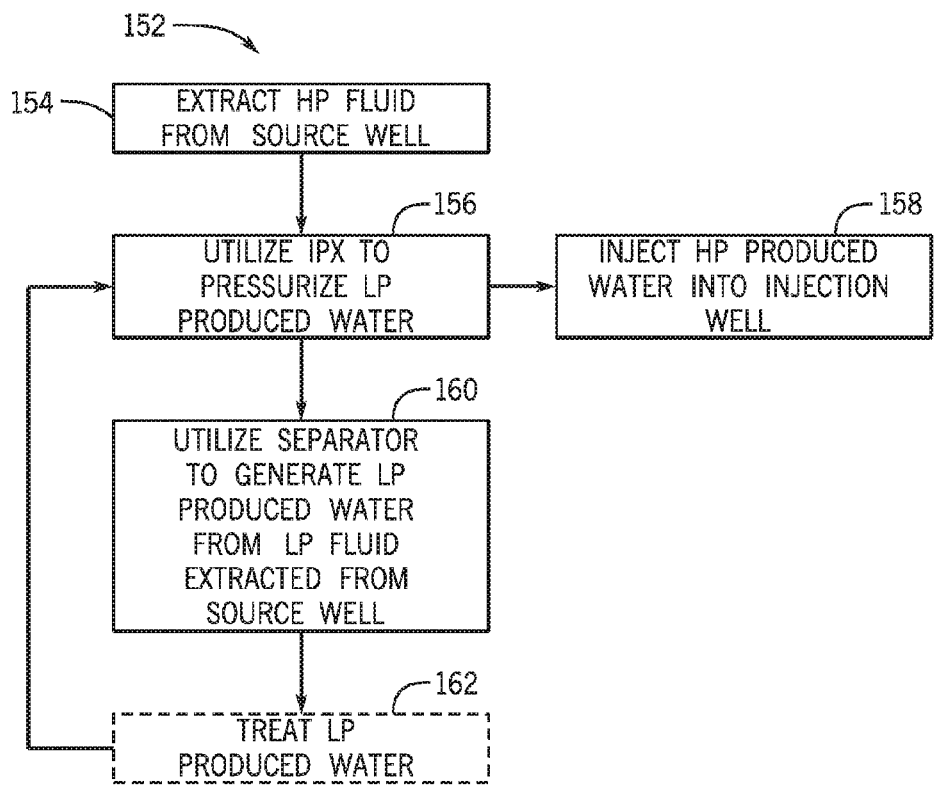
FIG. 10 is a flowchart of an embodiment of a method for pressurizing produced water for injection or reinjection into a well.

FIG. 10 is a flowchart of an embodiment of a method 152 for pressurizing produced water for injection or reinjection into a well 120. The method 152 includes extracting a high pressure fluid (e.g., including hydrocarbons such as oil and/or gas) from a source well 108 (e.g., producing well) (block 154). The method 152 also includes utilizing the IPX 104 to transfer pressure from the high pressure fluid to the low pressure produced water or treated produced water (block 156). The low pressure produced water enters the IPX 104 via a low pressure inlet 124. In certain embodiments, the method 152 includes treating the low pressure fluid as described above upstream of the low pressure inlet of the IPX 104 (block 162). The method 152 includes injecting (or reinjecting) the pressurized produced water, after it exits the IPX 104 via a high pressure outlet 134, into an injection well 120 (e.g., enhanced recovery well, disposal well, etc.) (block 158). The fluid (e.g., including hydrocarbons) utilized to pressurize the produced water or treated produced water exits the IPX 104 at a lower pressure via a low pressure outlet 136. The method 152 includes utilizing a separator 102 to separate the low pressure fluid (i.e., including the hydrocarbons) into a variety of components (e.g., oil, gas, rock, produced water, etc.) (block 160). The produced water separated from the low pressure fluid may be utilized for injection or reinjection into the well 120 upon pressurization within the IPX 104.

Figure 11:
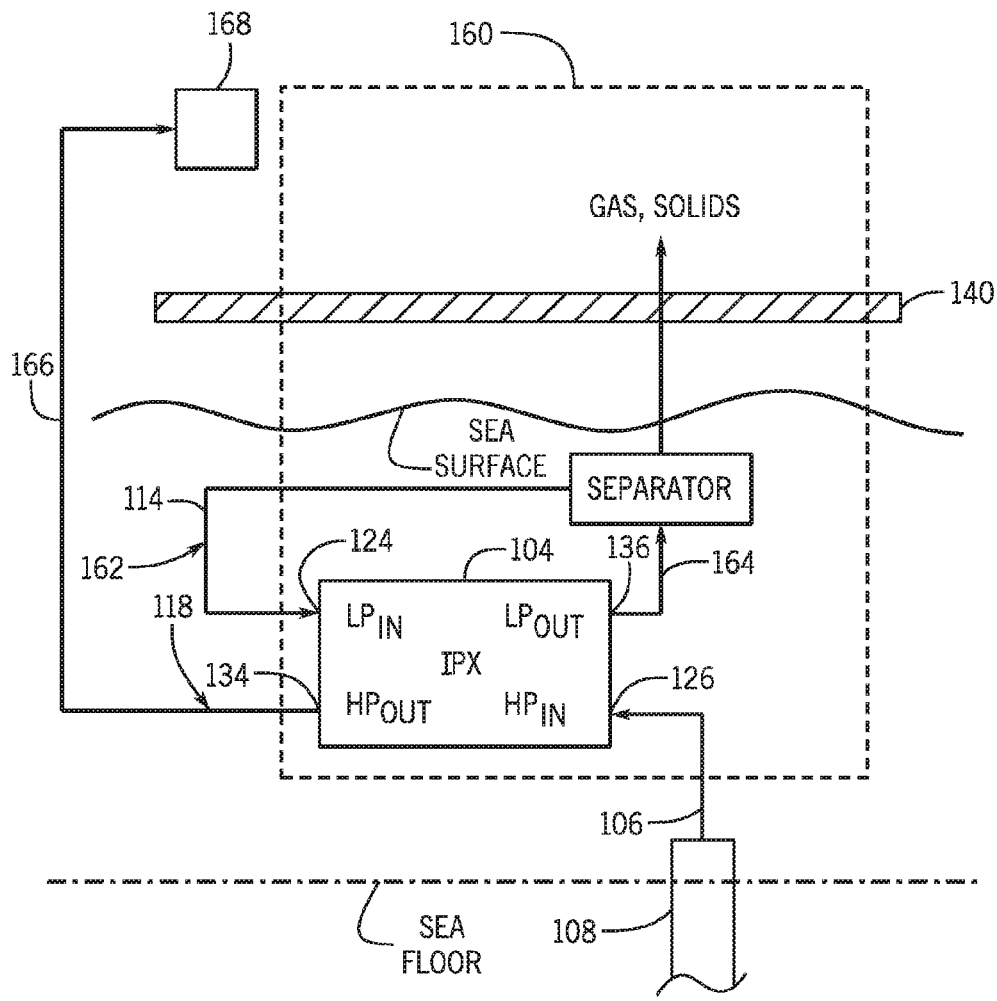
FIG. 11 is a schematic diagram of an embodiment of a fluid transportation system having a rotary IPX utilized offshore and located subsea (e.g., for moving oil above sea)

The IPX 104 and/or separator 102 may be utilized for applications (described in FIGS. 11-15) other than injection or reinjection. FIG. 11 is a schematic diagram of an embodiment of a fluid transport system 160 having a rotary IPX 104 utilized offshore (e.g., on an oil platform 140). As depicted in FIG. 11, both the separator 102 and the IPX 104 are located under water (e.g., on the sea floor). In other embodiments, the IPX 104 and/or the separator 102 may be located topside on the oil platform 140. The location of the components of the fluid transport system 160 (in particular, the IPX 104) depends on the conditions of the reservoir and other factors.

The fluid transport system 160 functions by receiving a high pressure, multi-phase fluid 106 (e.g., including water and hydrocarbons such as oil and/or gas) extracted from the source well 108. The high pressure fluid 106 flows into a high pressure inlet 126 of the IPX 104. A low pressure, single phase fluid 162 such as oil flows from the separator 102 (or a tank that stores the oil) to the low pressure inlet 124 of the IPX 104. In certain embodiments, a flow control device may regulate the flow of the oil 162 to the IPX 104. In the IPX 104, pressure is transferred from the high pressure fluid 106 to the low pressure oil 162 resulting in a low pressure fluid 164 for the fluid 106 extracted from the source well 108 and a high pressure oil 166. The high pressure oil 166, after exiting a high pressure outlet 134 of the IPX 104, is utilized by the fluid transport system 160 for lifting or transporting the oil 166 above the sea surface to the oil platform 140 (e.g., to a tank 168 or vessel). In certain embodiments, a flow control device may regulate the flow of the high pressure oil 166 above the sea surface to its destination. The low pressure fluid 164 (e.g., including hydrocarbons), after exiting a low pressure outlet 136 of the IPX 104, is provided to the separator 102 for separation into various components (e.g., oil, gas, produced water, etc.).

Figure 12:
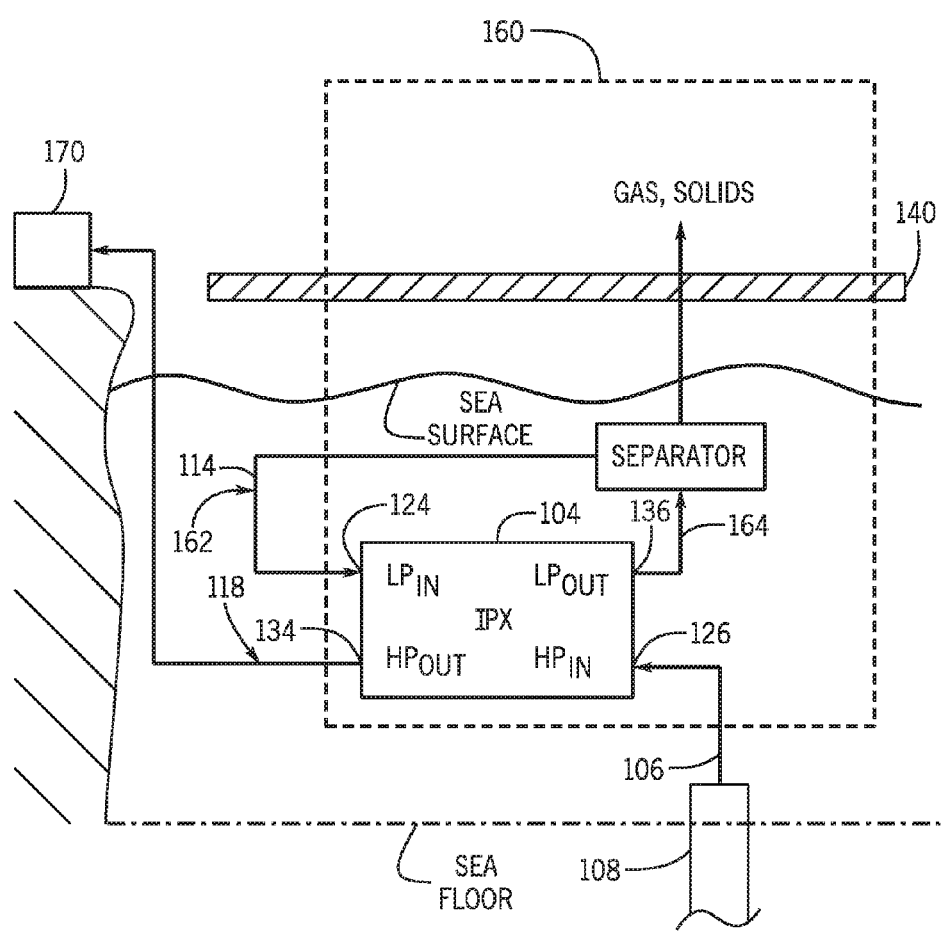
FIG. 12 is a schematic diagram of an embodiment of a fluid transportation system having a rotary IPX utilized offshore and located subsea (e.g., for transporting oil to shore)

FIG. 12 is a schematic diagram of an embodiment of a fluid transport system 160 having a rotary IPX 104 utilized offshore (e.g., on an oil platform 140). The fluid transport system 160 is as described in FIG. 11 except the high pressure oil 166 is transported to an onshore storage facility 170. In certain embodiments, the fluid transport system 160 of FIGS. 11 and 12 may be utilized for pressurizing gas for moving or transporting the gas.

Figure 13:
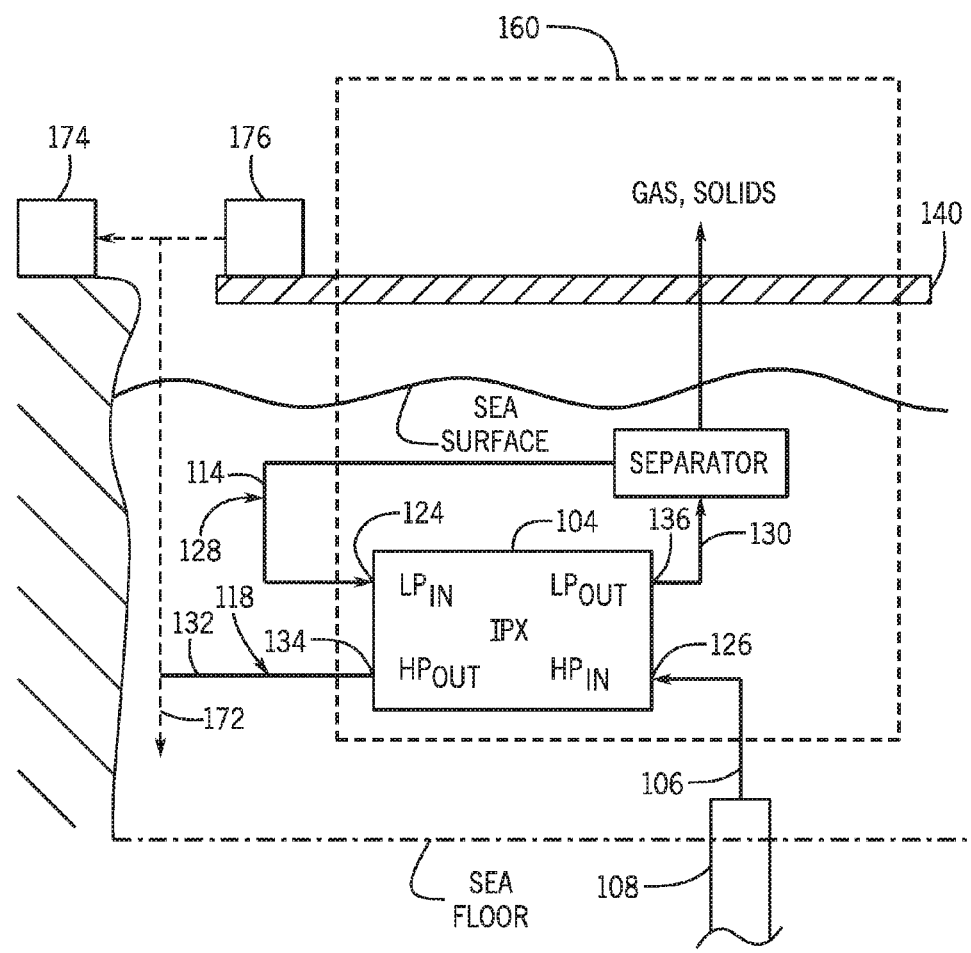
FIG. 13 is a schematic diagram of an embodiment of a fluid transportation system having a rotary IPX utilized offshore and located subsea (e.g., for disposal of produced water)

FIG. 13 is a schematic diagram of an embodiment of a fluid transport system 160 having a rotary IPX 104 utilized offshore (e.g., on an oil platform 140). As depicted in FIG. 11, both the separator 102 and the IPX 104 are located under water (e.g., on the sea floor). In other embodiments, the IPX 104 and/or the separator 102 may be located topside on the oil platform 140. The location of the components of the fluid transport system 160 (in particular, the IPX 104) depends on the conditions of the reservoir and other factors. The fluid transport system 160 operates similar to the fluid injection system 100 of FIG. 8 except the produced water 132 is not utilized for injection or reinjection but instead disposed of. Instead, as depicted in FIG. 13, the high pressure produced water 132 may be disposed of by discharging it into the sea (as indicated by reference numeral 172), transporting it to a treatment facility 174 onshore, or transporting to a treatment facility 176 on the oil platform 140. The treatment facilities 174, 176 treat the produced water 132 to remove contaminants.

Figure 14:
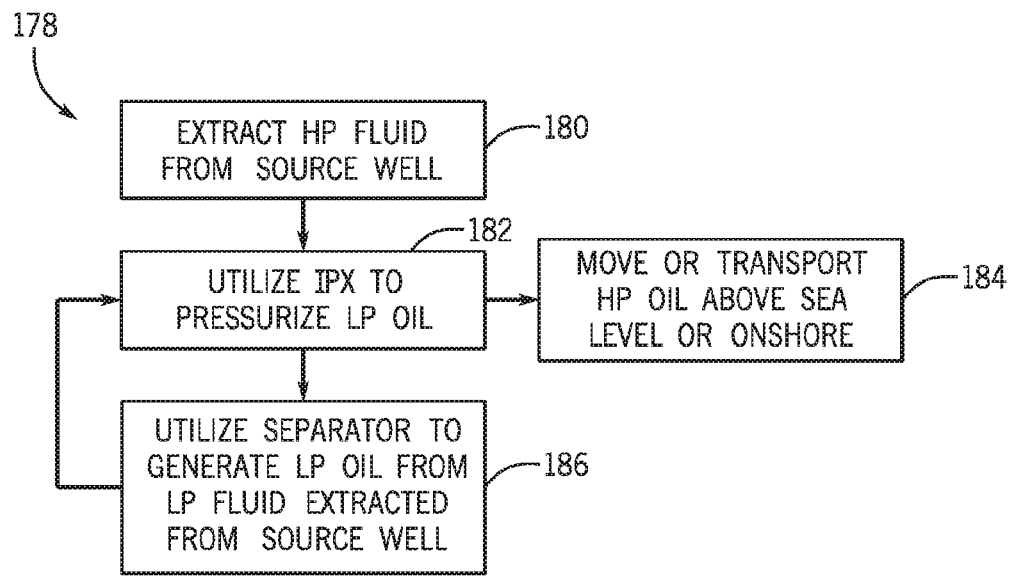
FIG. 14 is a flowchart of an embodiment of a method for pressurizing oil for moving above sea or transporting onshore.

FIG. 14 is a flowchart of an embodiment of a method 178 for pressurizing oil for moving above sea or transporting onshore. The method 178 includes extracting a high pressure, multi-phase fluid (e.g., including water and hydrocarbons such as oil and/or gas) from a source well 108 (e.g., producing well) (block 180). The method 178 also includes utilizing the IPX 104 to transfer pressure from the high pressure, multi-phase fluid to the low pressure oil (single phase fluid) (block 182). The low pressure oil enters the IPX 104 via a low pressure inlet 124. The method 178 includes moving the pressurized oil above sea level or transporting it onshore (block 184) after it exits the IPX 104 via a high pressure outlet 134. The multi-phase fluid utilized to pressurize the oil exits the IPX 104 at a lower pressure via a low pressure outlet 136. The method 178 includes utilizing a separator 102 to separate the low pressure fluid (i.e., including water and hydrocarbons) into a variety of components (e.g., oil, gas, rock, produced water, etc.) (block 186). The produced water separated from the low pressure fluid may be utilized for injection or reinjection into the well 120 upon pressurization within the IPX 104.

Figure 15:
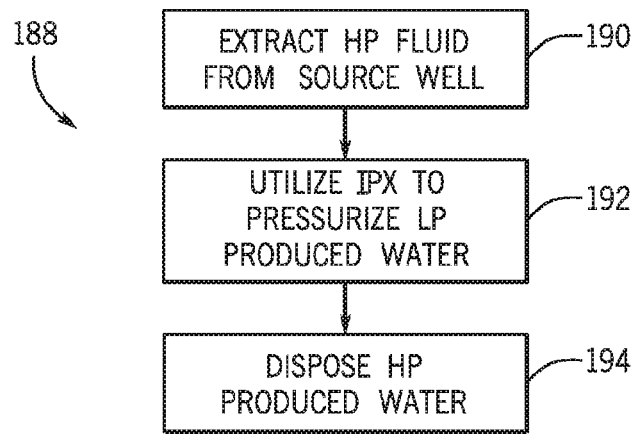
FIG. 15 is a flowchart of an embodiment of a method for pressurizing produced water for disposal.

FIG. 15 is a flowchart of an embodiment of a method 188 for pressurizing produced water for disposal. The method 188 includes extracting a high pressure, multi-phase fluid (e.g., including water and hydrocarbons such as oil and/or gas) from a source well 108 (e.g., producing well) (block 190). The method 188 also includes utilizing the IPX 104 to transfer pressure from the high pressure, multi-phase fluid to a low pressure fluid (e.g., produced water) for disposal (block 192). The low pressure fluid (e.g., produced water) enters the IPX 104 via a low pressure inlet 124. The method 188 includes disposing of the pressurized fluid (e.g., produced water) after it exits the IPX 104 via a high pressure outlet 134 (block 194). The high pressure produced water may be discharged into the sea or transported to a treatment facility to remove contaminants. The multi-phase fluid (e.g., including water and hydrocarbons) utilized to pressurize the low pressure fluid (e.g., produced water) exits the IPX 104 at a lower pressure via a low pressure outlet 136.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A system, comprising:
   a fluid injection system, comprising:
   a rotary isobaric pressure exchanger (IPX) configured to receive a first fluid, to directly receive a second fluid extracted from a source well, to utilize the second fluid to pressurize the first fluid for injection into an injection well, and to inject the pressurized first fluid into the injection well; and
   a high pressure source fluid flow path extending directly from the source well to the rotary IPX, wherein the high pressure source fluid flow path is configured to divert the second fluid directly from the source well to the rotary IPX.

2. The system of claim 1, wherein the first fluid comprises sea water.

3. The system of claim 1, wherein the first fluid comprises produced water.

4. The system of claim 3, wherein the first fluid is derived from the second fluid subsequent to the second fluid passing through the rotary IPX.

5. The system of claim 4, comprising a separator configured to separate the second fluid into a plurality of components, wherein the plurality of components comprises at least the produced water and hydrocarbons.

6. The system of claim 5, wherein the fluid injection system comprises a low pressure produced water flow path extending from the separator to the rotary IPX, and a first fluid control device disposed along the low pressure produced water flow path and configured to regulate a first flow of the first fluid into the rotary IPX.

7. The system of claim 6, wherein the fluid injection system comprises a high pressure produced water flow path extending from the rotary IPX to the injection well, and a second fluid control device disposed along the high pressure produced water flow path and configured to regulate a second flow of the first fluid from the rotary IPX and into the injection well.

8. The system of claim 6, wherein the fluid injection system comprises a treatment system coupled to the low pressure produced water flow path and configured to treat the first fluid with one or more chemicals prior to the rotary IPX receiving the first fluid to lower a surface tension of the first fluid.

9. The system of claim 4, wherein the fluid injection system is configured for onshore hydrocarbon extraction operations.

10. The system of claim 4, wherein the fluid injection system is configured for offshore hydrocarbon extraction operations.

11. The system of claim 5, wherein the separator is disposed on a platform above a sea surface.

12. The system of claim 11, wherein the rotary IPX is disposed below the sea surface.

13. A system, comprising:
a fluid injection system, comprising:
a rotary isobaric pressure exchanger (IPX) configured to receive a low pressure produced water, to directly receive a high pressure first fluid extracted from a source well, to utilize the high pressure first fluid to pressurize the low pressure produced water to a high pressure produced water for injection into an injection well, and to inject the high pressure produced water into the injection well;
a high pressure source fluid flow path extending directly from the source well to the rotary IPX, wherein the high pressure source fluid flow path is configured to divert the first fluid directly from the source well to the rotary IPX; and
a separator configured to receive a low pressure first fluid from the rotary IPX subsequent to utilization of the first fluid to pressurize the low pressure produced water and to separate the low pressure first fluid into a plurality of components, wherein the plurality of components comprises at least the low pressure produced water and hydrocarbons.

14. The system of claim 13, wherein the fluid injection system comprises a low pressure produced water flow path extending from the separator to the rotary IPX, and a first fluid control device disposed along the low pressure produced water flow path and configured to regulate a first flow of the low pressure produced water into the rotary IPX.

15. The system of claim 14, wherein the fluid injection system comprises a high pressure produced water flow path extending from the rotary IPX to the injection well, and a second fluid control device disposed along the high pressure produced water flow path and configured to regulate a second flow of the high pressure produced water from the rotary IPX and into the injection well.

16. The system of claim 14, wherein the fluid injection system comprises a treatment system coupled to the low pressure produced water flow path and configured to treat the low pressure produced water with one or more chemicals prior to the rotary IPX receiving the low pressure produced water to lower a surface tension of the low pressure produced water.

17. The system of claim 13, wherein the fluid injection system is configured for offshore hydrocarbon extraction operations.

18. The system of claim 17, wherein the separator is disposed on a platform above a sea surface, and the rotary IPX is disposed below the sea surface.

19. A method for utilizing a fluid injection system in a hydrocarbon extraction operation, comprising:
extracting a high pressure fluid from a source well;
directly diverting the high pressure fluid from the source well to a rotary isobaric pressure exchanger (IPX) along a high pressure source fluid flow path extending directly from the source well to the rotary IPX;
utilizing the rotary IPX to pressurize a first fluid using the high pressure fluid; and
injecting a pressurized first fluid received from the rotary IPX into an injection well.

20. The method of claim 19, separating, via a separator, the first fluid from the high pressure fluid subsequent to the high pressure fluid being utilized to pressurize the first fluid.

* * * * *